United States Patent [19]

Leonhardt et al.

[11] 4,352,112
[45] Sep. 28, 1982

[54] REFLECTOR WITH AIR PRESSURE MEANS

[76] Inventors: Fritz Leonhardt; Wolfhart Andra; Wilhelm Zellner; Jörg Schlaich, all of Lenzhalde 16, D-7000 Stuttgart 1, Fed. Rep. of Germany

[21] Appl. No.: 941,159

[22] Filed: Sep. 11, 1978

[30] Foreign Application Priority Data

Sep. 10, 1977 [DE] Fed. Rep. of Germany ....... 2740813

[51] Int. Cl.³ .............................................. H01Q 15/20
[52] U.S. Cl. .................................... 343/915; 343/912
[58] Field of Search ....................... 343/914, 915, 912; 350/295

[56] References Cited

U.S. PATENT DOCUMENTS

| 2,952,189 | 9/1960 | Pajes | 343/915 |
| 2,976,533 | 3/1961 | Salisbury | 350/296 |
| 3,056,131 | 9/1962 | McCreary | 343/295 |
| 3,130,406 | 4/1964 | Jones-Hinton et al. | 350/295 |
| 3,176,302 | 3/1965 | Tipton | 343/295 |
| 4,093,351 | 6/1978 | Perkins et al. | 343/295 |

Primary Examiner—David K. Moore
Attorney, Agent, or Firm—Pennie & Edmonds

[57] ABSTRACT

This invention relates to large reflectors in particular those used for antennas, solar mirrors and the like having a concave reflector surface. The reflector comprises a membrane having a reflective surface, which membrane in its initial planar state is capable of being deformed in all directions in its plane. The reflector is mounted in a gas-tight chamber as one wall thereof and a differential pressure is exerted across the membrane either by way of increased or reduced pressure applied to the chamber. When deformed to concave shape, such deformation may be sufficient to cause permanent deformation of the membrane to its concave shape when it has been stretched beyond its elastic limit and plastic deformation has occurred. The reflector may then be used removed from the gas-tight chamber and when so used is preferably backed with a rigid foam backing. Alternatively, the differential pressure applied to the membrane may be insufficient to permanently deform the membrane to its concave shape and a rigid foam backing or the like applied thereto while it is in its deformed concave shape. In this circumstance the rigid foam maintains the reflector in its deformed concave shape. Still further, the differential pressure across the membrane whether sufficient to cause permanent deformation or not may be maintained during use of the reflector. In this circumstance the gas-tight chamber becomes a supporting structure for the concave membrane and the differential pressure maintains the shape. A rigid ring serves as the circumferential edge of the chamber and the deformed membrane is maintained in tension by the differential pressure.

21 Claims, 9 Drawing Figures

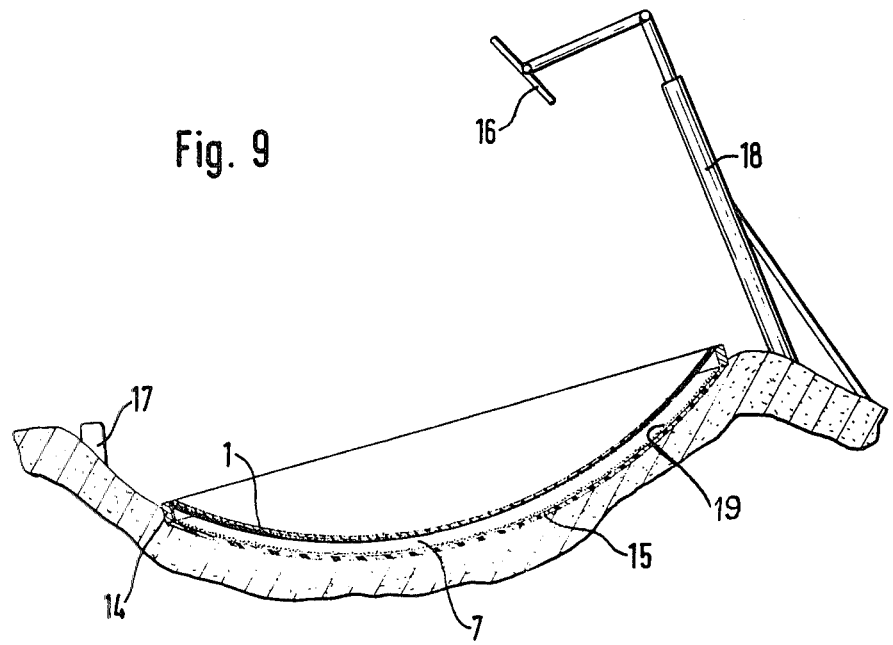

REFLECTOR WITH AIR PRESSURE MEANS

BACKGROUND OF THE INVENTION

Very large reflectors used as antennas or solar mirrors or the like are difficult and expensive to construct. While small reflectors can be readily produced by hot shaping of glass or metal, large reflectors generally must be constructed from segments making it difficult to achieve the desired curvature (generally a paraboloid) necessary for optimal operation. Further, the individual segments of the reflector must be supported by extensive supporting structures which in very large diameters become complex and extraordinarily expensive. At the same time there is a very definite need for such large reflectors both as antennas and in collection of solar energy. As is known, large solar energy mirrors are used to collect radiation over a large area and concentrate it at a focal point to heat a chosen operating medium.

SUMMARY OF THE INVENTION

It is the object of this invention to provide large reflectors that are easy and economical to produce even in extremely large diameters which reflectors have reflection properties approaching or comparable to those achieved with small concave mirrors of glass.

Reflectors constructed in accordance with the present invention are produced from an originally flat reflector membrane made of a material that is deformable by stretching in any direction in its plane and in which the membrane is deformed to the desired concave shape by applying a differential pressure across the membrane. In its simplest application a segment of a spherical dome is produced which corresponds approximately to the apex region of a paraboloid. In most instances a paraboloid shape is to be preferred.

The size of reflectors built in accordance with the present invention is practically unrestricted with diameters of 50 meters or more being easily conceivable. Smaller diameters are also possible.

The deformation may be in the elastic or in the plastic range. As used herein the term "elastic" means that the deformation is insufficient to permanently deform the membrane while the term "plastic"; means that the membrane upon deformation has been permanently deformed although in many instances it may recover slightly thus altering from its greatest deformed shape. One consideration important with respect to whether elastic or plastic deformation takes place is the ratio of depth to the diameter of the reflector, i.e. rise-to-span ratio. If this ratio is high, plastic deformation will, as a rule, be involved. Still other considerations such as pre-stressing as mentioned below will also determine whether elastic or plastic deformation takes place.

The reflector may be made of a variety of materials either coated or uncoated to achieve reflectivity. One particularly suitable material is aluminum sheet of approximately 0.5 mm. in thickness although depending upon the size and available pressure differential thicknesses as high as about 1.0 mm. are contemplated. Aluminum can be polished to a very high luster suitable for such reflectors. Other materials including plastic foils, rubber impregnated woven fabrics, and the like are contemplated it being only necessary that they be tensionable in their planar state in all directions of their plane. That is, they must be deformable i.e. capable of supporting tension in all directions in their plane.

For very large reflectors it may be advantageous to construct the membrane initially in sections such as panels or strips or the like. It is only necessary that these sections be connected in fluid tight manner. These sections may also be so constructed as to contribute a different degree of stretch behavior in one area as opposed to a different area thus permitting an exact paraboloid shape to be achieved. For example, the separate membrane sections may differ in thickness yet be of the same material as the other sections or, alternatively, with the material being the same they may have different upper elastic limits or strengths due to appropriate treatment. Similarly, different stretch characteristics in one area as opposed to other areas may be obtained with materials of different modulus of elasticity.

Still further, to achieve various patterns of curvatures it is possible to apply additional membrane reinforcing strips to the membrane in specific areas or shapes either on the front or the back (preferably the latter) of the membrane which strips may be of the same or different material, thickness, or pretreated condition. Such additional reinforcing strips can serve to adjust the stretchability of the overall membrane so that certain areas stretch differently than other areas to achieve the desired ultimate curvature.

It is contemplated that the membrane of the reflector be shaped while the same is serving as one wall of a gas-tight chamber in which the pressure is either increased or decreased as compared with ambient pressure. It is further contemplated that the reflective membrane after deformation may be removed from the gas-tight chamber and used in its deformed shape if it has been permanently deformed. It is preferred in this instance to provide a rigid foam backing for the reflective membrane. Alternatively, if the reflective membrane is not permanently deformed it may be provided with a rigid foam backing while still deformed by differential pressure which backing holds the membrane in the desired concave shape. Still further, it is contemplated that the deformed reflective membrane may be used in place as one wall of the gas-tight chamber in which case the chamber itself and the membrane are mutually supportive. A preferred construction of this type includes a circumferential rigid ring to which the membrane is sealed gas-tight and a suitable reduced pressure created in the chamber. In this way the membrane becomes tensioned and applies tension forces to the rigid circumferential ring in much the same way as tension forces in a bicycle wheel are transmitted by the spokes of the rim.

In the rigid foam backed reflector types the foam backing preferably has an outer skin on the surface thereof opposite to that which is secured to the reflective membrane. This opposite surface may be curved in a manner parallel to the concave curvature of the reflective membrane, oppositely curved (concave itself) or this opposite surface may be flat. That is to say that in a cross-section taken through the membrane and backing the cross-section may be concave-convex; bi-concave; or concave-planar. Where the reflective membrane has a foam backing but is not to be permanently deformed itself the rigid foam must be applied while the reflector membrane is still under the differential pressure of shaping and the foam must be strong enough to maintain the membrane in the desired shape. It is also contemplated, however, to provide a rigid foam backing to a reflector membrane that has been previously plastically permanently deformed. In either event suitable openings or pockets may be provided in the foam or in the foam and the reflector for various purposes.

In those instances where the reflector membrane is used in place as one wall of a gas-tight chamber it is generally preferred that the chamber should be subjected to a negative pressure thus creating the differential pressure across the membrane. This causes a stressing of the membrane as above described with the stresses being imparted to the circumferential rigid ring as above described and creates a mutually supportive structure that is of a high degree of inherent rigidity. The gas-tight chamber is preferably connected to a device that regulates the degree of vacuum applied to the chamber in order to compensate for variations of the membrane which may be caused by small leaks, thermal effects on the membrane and the chamber, and the like.

The reflector membrane may be provided to the vacuum chamber already plastically pre-shaped as well. As mentioned the reflector membrane may receive its plastic or elastic shaping from the vacuum chamber itself.

The gas-tight chamber may in principle be in any desired form but it is particularly advantageous for the same to have a rearward closure membrane spaced from the reflector membrane with the edges of the two membranes being maintained in spaced relation to each other by a rigid ring construction to which they are sealed at the circumference. If the membranes are of the same or similar materials having similar stretchability then upon applying negative pressure to the chamber it will be given a bi-concave cross-section by the two stressed membranes. This results in an extremely light and inherently stiff and stable construction in that both membranes are in tension and acting much like the spokes of a bicycle wheel. In many installations the reflector, when used to collect solar energy, is positioned to align with a tower and may or may not itself be mounted to move with the movement of the sun to maintain that alignment. In other installations a heat exchanger is mounted at the focal point of the reflector and moves with the reflector when the same moves to follow the sun. In this latter case reflectors of the present invention can readily support the heat exchanger directly from the vacuum chamber (particularly from the rigid ring at the circumference) by use of a suitable support structure connecting the heat exchanger to the rigid ring.

In most instances it is preferred that the second closure membrane of the vacuum chamber have a different stretchability characteristic than the reflector membrane. A lower stretchability, for example, permits the use of a flatter construction (i.e. the rigid ring is of lesser height) since the closure member will be drawn less deeply into the vacuum chamber than the reflector membrane. It is also contemplated, however, that the closure membrane be of sufficient rigidity as to avoid any substantial deformation.

The rigid ring construction advantageously comprises a suitable structural member to which both membranes are sealed gas-tight by any suitable mechanical means. For very large reflectors or for reflectors where the rise-to-span ratio is great and would thus require a relatively tall pressure ring it is more advantageous to construct the ring of two separate smaller rings each of which is sealed gas-tight with one of the membranes and then to hold the rigid rings in spaced relationship by means of metal rods. In order to complete the gas-tight chamber a sealing strip is provided at the periphery and extending between the edges of the membranes. This construction generally provides for savings in weight as well.

In still another embodiment of the invention that is particularly useful for very large reflectors the reflector membrane is arranged in a ground depression. Such extremely large reflectors are contemplated for use with solar power plants. In this embodiment the rigid ring is replaced by an annular foundation in the ground with the area within the foundation being made gas-tight by a suitable material such as a gas-tight foil of plastic or the like. In order to insure that this gas-tight foil does not rise up when vacuum is applied to the chamber the same may be covered with earth or other material of sufficient weight to maintain the foil in its desired position. This embodiment permits the very economical erection of extremely large reflectors.

In some installations an auxiliary reflector may be arranged in the region of the focal point of the reflector membrane which auxiliary reflector may be adjusted accordingly to receive the concentrated rays from the reflector membrane and reflect them to a heat absorber, heat exchanger, or other receiver. This arrangement is particularly suitable where the reflector membrane is positioned in a ground depression and is thus not capable of being transversed to follow the movement of the sun. In such an installation the auxiliary reflector may be adjusted periodically or constantly to approximate this traversing effect.

It is also contemplated that the reflector membrane may be pre-stressed in place on the vacuum chamber before the differential pressure is applied thereacross. In many circumstances this pre-stressing has several advantages. Any folds that may have been formed when fitting together a large membrane from smaller sections can be removed before the actual shaping of the membrane by such pre-stressing. Also, such pre-stressing may be advantageous or necessary when it is desired to plastically or permanently deform the membrane but the required curvature with the particular given material and the other parameters would otherwise result in only an elastic stretching of the membrane (or only very slight plastic stretching) if only differential pressure were applied. By pre-stressing the membrane sufficiently then it is possible to achieve permanent plastic deformation even when the differential pressure will affect only a very slight stretching of the material such as when the rise-to-span ratio is very low. Such pre-stressing is also important when, given the particular size, shape, and material of the reflector the differential pressure to shape the membrane would create a stress in a critical range just below the flow limit. In such a circumstance if the membrane is to be used in place on the vacuum chamber then any additional stress such as from the wind could result in attaining the flow limit of the material. Still further, the pre-stressing may permit the fabrication of the membrane at a remote site with the membrane then being rolled or folded and transported to the desired site. By use of the pre-stressing any folds or pleats that have occurred in transport may be removed.

Still further, this pre-stressing may be necessary in order to provide the requisite tension to insure that the membrane and its vacuum chamber are mutually supporting and stable against wind loads and the like. Indeed, in this and other applications mentioned it may well be desirable to maintain the pre-stressing while the membrane is also subjected to differential pressure. The pre-stressing forces are applied radially to the membrane and are maintained while the membrane is under differential pressure. Thus the membrane and the rigid ring support become mutually supportive in much the same way as a spoked bicycle wheel as mentioned above. This pre-stressing that is applied before and during the time the membrane is under differential pressure also serves to smooth out any folds that may occur and in particular those that may occur at the edge due to shrinking of the rigid ring under the differential pressure applied, expansion and contraction effects of temperature, the forces transmitted to the ring by the membrane, and the like. This additional radial tensioning can be achieved by any suitable known means such as by springs, inflatable tubes, temperature differences during installation and the like.

The invention also contemplates a method for producing a reflector as described above. In this method one or, preferably, two reflectors are produced at the same time by installing two flat reflector membranes in sealed relationship to a rigid ring and applying positive or negative pressure to the interior. When positive pressure is applied a structure of bi-convex cross-section is formed which after applying sufficient pressure to create a permanent plastic deformation may be divided to provide two concave membranes. These may be backed with a rigid foam and then used or they may be attached to vacuum chambers as either the reflector membrane or the closure membrane. On the other hand, if the membranes are not permanently deformed, a rigid foam may be applied to the membranes while elastically deformed by the differential pressure and then removed from the rigid ring.

When negative pressure is supplied to this construction the two membranes can again be separated after application of sufficient differential pressure to create permanent plastic deformation, a rigid foam backing applied and the reflector membranes used as is or as either of the membranes for a vacuum chamber. Alternatively, in this mode of formation one of the membranes may be left on the rigid ring as the reflector membrane while the other is removed and replaced by a membrane of a different kind resulting in a vacuum chamber with a reflective membrane ready for operation. Finally, it is possible to use this bi-convex arrangement of two membranes together on the rigid ring as is with the vacuum chamber as a reflector. In this latter instance the membranes may only have been deformed in their respective elastic ranges and the reflector-vacuum chamber used in this manner or one or both of the membranes may have been permanently plastically deformed by the use of a greater differential pressure.

For large quantities of reflectors which are to be permanently plastically deformed this method provides a particularly advantageous and economical arrangement since not only are two membranes formed simultaneously but in those instances where the membranes are to be used on a vacuum chamber the rigid ring construction of the ultimate chamber with which the membrane is to be used may be much lighter than that used to initially shape the membrane.

As with the single membrane one or both of the membranes may undergo radial stressing before or before and during the differential pressure application.

BRIEF DESCRIPTION OF THE DRAWINGS

The present invention will be apparent to those skilled in the art from the present description and the following detailed description and the drawings in which:

FIG. 9 shows the reflector of this invention applied to a ground depression.

DETAILED DESCRIPTION OF THE PREFERRED EMBODIMENTS

Figure 1:
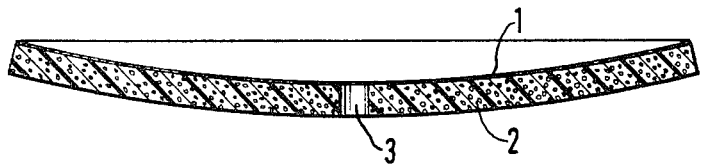
FIG. 1 is a schematic cross-section through a reflector according to the present invention.

FIG. 1 shows a reflector particularly useful for collecting the sun's energy which may have a diameter of 50 meters or more. The inner face 1 of the reflector comprises a membrane having a reflective surface. One preferred material for this membrane is aluminum sheet which may be polished to a high luster although other materials such as certain plastic sheets of generally low stretchability having a reflective coating thereon may also be used. Whatever the material used it must be in its planar form capable of withstanding tension in all directions in its plane. That is to say the material must be deformable in all directions in its plane. As shown in FIG. 1 the reflector has already been formed into a concave shape and the reflector membrane 1 is provided with a rigid foam backing 2 which has a rearward surface generally parallel to the membrane 1 thus providing a concave-convex cross-section. In the center of the reflector an opening 3 is provided entirely through the foam backing and the membrane. Such opening and others extending only through the backing 2 may be provided for various purposes including mounting, or the passage of concentrated rays from the sun through the opening 3.

Figure 2:
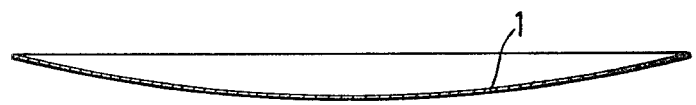
FIG. 2 is a schematic cross-section through the reflector membrane of FIG. 1.

FIG. 2 shows the reflector membrane 1 before the application thereto of the foam backing 2. As will be apparent the membrane 1 has already been deformed into a concave shape by permanent plastic deformation.

Figure 3:
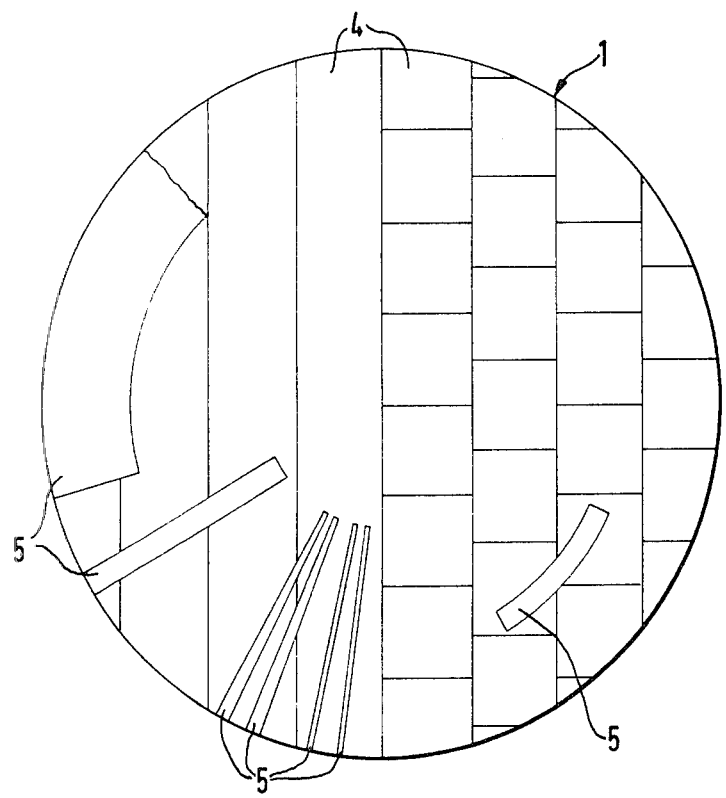
FIG. 3 is a plan view of the reflector membrane before deformation.

FIG. 3 shows the reflector membrane 1 before deformation as having been made up from a plurality of individual membrane sections 4. Sections 4 are joined to each other in gas-tight relationship. It will be understood that if the reflector membrane material is available in sufficient size for the desired reflector that a single piece may be used instead of sections 4. Use of sections 4 however does permit the use of sections of different thickness or of different material or otherwise differing to provide for differences in stretchability in order to achieve the ultimate desired shape. In this way the ultimate shaping of the reflector may achieve a true paraboloid shape or other desired curvature different from a simple spherical dome section.

Similarly, reinforcing membrane elements 5 of different shapes as shown in FIG. 3 or other shapes may be provided at selected points and areas and securely fastened to the membrane 1 for the same purpose. That is, to alter the stretchability of the membrane 1 in selected areas for desired effects. As shown in FIG. 3 these elements 5 that affect the stretchability are applied to the front face of the membrane 1; however, it may be preferred to locate them on the rearward surface of the membrane 1 particularly where they would otherwise reduce the effectiveness of the reflective surface of the membrane 1.

Figure 4:
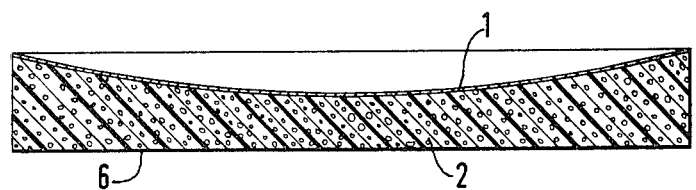
FIG. 4 shows another embodiment of the reflector of this invention.

FIG. 4 shows a reflector similar to that of FIG. 1 except that the rearward surface of the foam backing 2 is provided with an outer skin 6 and is planar in configuration rather than convex as in FIG. 1. This construction is particularly advantageous when the reflective membrane 1 has not been stretched beyond its elastic limit and the strength of the rigid foam itself must be relied upon to maintain the shape of the reflective membrane 1. The outer skin 6 may be of any suitable material including sheets of paper, metal, plastic and the like which contribute to the strengthening of the backing 2.

Figure 5:
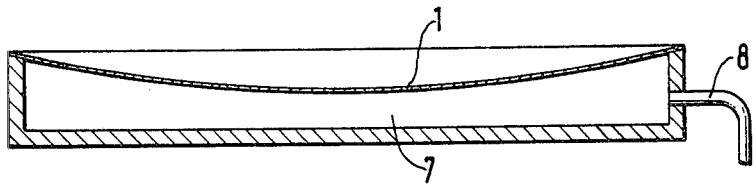
FIG. 5 shows a further embodiment of the reflector of this invention which is also an apparatus for shaping the reflector membrane of this invention.

In FIG. 5 there is shown a vacuum chamber 7 one wall of which is the reflector membrane 1. The vacuum chamber 7 is connected by means of a conduit 8 to a source of vacuum (not shown) and a regulating device for adjusting the vacuum in the chamber 7 (also not shown). The vacuum produces in the membrane tensions which impart to it the behavior of an inherently stiff and stable membrane shell which cooperates with the vacuum chamber in a mutually supporting arrangement. This is so whether the degree of vacuum applied is sufficient to plastically deform the membrane 1 or merely to elastically deform the same.

If desired, springs, inflatable tubes, and other like mechanical devices may be used to pre-stress the membrane 1 before application of the vacuum to the vacuum chamber. Similarly, this pre-stressing can be continued during the application of the vacuum. This pre-stressing serves to eliminate any of the folds or pleats that might be present in the reflector membrane 1 or that might be induced upon the application of a vacuum to the chamber 7 resulting from any shrinking of the annular wall of the vacuum chamber 7. Such pre-stressing is of particular importance if the membrane is only stretched within its plastic limits as may occur with a low rise-to-span ratio. Such pre-stressing also permits the control of material properties. For membranes which are to be deformed relatively strongly in the elastic range pre-stressing avoids the possibility that subsequent external loads such as wind loads added to the deformation forces of the differential pressure across the membrane might create states of tension in the range of the flow limit.

The apparatus of FIG. 5 may in its entirety constitute a suitable reflector. When the same is used as a reflector the differential pressure by use of the vacuum is maintained during the use of the reflector and is suitably regulated by the regulator to maintain the shape of the reflector membrane 1. The structure of FIG. 5 would normally in such circumstances be mounted upon suitable structures for traversing in order to follow the sun's path. In such a circumstance the reflective membrane 1 may be either elastically or plastically deformed though generally it will be the former.

At the same time, however, the apparatus of FIG. 5 is contemplated as being useful for the production of reflectors which are not to be used while part of a vacuum chamber. In particular where large quantities of reflectors are to be manufactured the apparatus of FIG. 5 is suitable. That is to say that permanently plastically deformed reflective membranes such as shown in FIG. 2 whether foam backed as in FIGS. 1 and 4 or not may be produced by the apparatus of FIG. 5. Still further, even if it is planned to use the reflector in use as one wall of a vacuum chamber it may be advantageous to first plastically deform the same with the apparatus of FIG. 5 and then to mount the same in a similar apparatus for use. In situations where a permanently deformed membrane is to be used as one wall of a continually operating vacuum chamber as a reflector, the vacuum chamber including the annular ring portion which is to be used with the permanently deformed membrane requires less strength since it is generally not subjected to forces as high as those experienced when initially plastically deforming the membrane. In this way a single apparatus such as shown in FIG. 5 may be constructed very strongly to withstand the higher forces of permanent plastic deformation while a number of such apparatuses designed for use as reflectors may be constructed of lighter materials.

Figure 6:
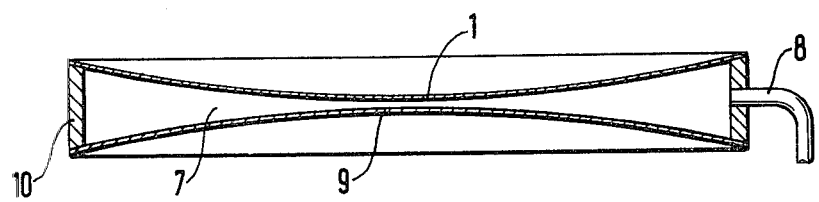
FIG. 6 is a further embodiment of FIG. 5.

The apparatus of FIG. 6 is similar to that shown in FIG. 5 excepting that instead of having a rigid rearward closure member as in FIG. 5, the apparatus of FIG. 6 has a rearward membrane 9 which like the membrane 1 is capable of being deformed in all directions in the plane of its initial planar state. The vacuum chamber 7 comprises an annular rigid ring 10, the reflector membrane 1, and the closure membrane 9 as well as the conduit 8 connecting the same to a vacuum source and vacuum regulator (neither shown). Both the membrane 1 and the membrane 9 are sealed gas-tight to the annular ring 10 by means of any suitable known device such as clamps which will achieve a gas-tight seal. In the usual case the closure member 9 will have less stretchability than the reflector membrane 1 in order to limit the vertical height (vertically as shown in FIG. 6) of the rigid annular ring 10. However, if one wishes to use cheaper material for the membrane 9 which material has greater stretchability then, in that event, it may be more economical to provide for the necessary increase in height of the rigid annular ring 10. The annular ring 10 may be of any suitable material such as steel having a square, tubular, or "U" shape cross-section, for example. It is contemplated that the apparatus of FIG. 6 may be used either as the reflector itself when the apparatus of FIG. 6 is mounted upon a suitable support or as a production mechanism for producing curved reflector membranes which are to be used apart from the production apparatus either in a lighter weight vacuum chamber as mentioned above, or alone, or when backed with some material such as rigid foam. When used as the entire reflector as shown in FIG. 6, it may be desirable to have the diaphragms 1 and 9 of different stretchability in order to achieve different curvatures either of which may be faced toward the sun depending upon the particular application or experiment being conducted.

When the apparatus of FIG. 6 is used for the production of reflector membranes to be used apart from the production apparatus it has the advantage over the apparatus of FIG. 5 of producing two products at a time instead of only one. The apparatus of FIG. 6 will generally be used only when producing reflector membranes that are permanently plastically deformed since it is essentially impossible to apply a supporting foam backing to the membranes 1 and 9 without removing them from the device. If the membranes are only elastically deformed they will reassume their planar shape upon release of the vacuum and removal from the device.

Figure 7:
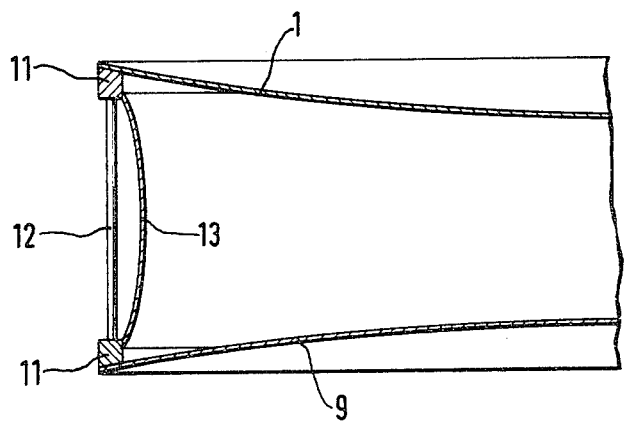
FIG. 7 shows a modified construction for a portion of the apparatus of FIG. 6.

FIG. 7 shows a variation of FIG. 6 of particular usefulness where the rigid annular ring must assume considerable height. In the arrangement of FIG. 7 there are two annular rings 11, one sealed gas-tight to the membrane 1 and the other sealed gas-tight to the membrane 9. The annular rings 11 are kept in spaced apart condition by rods 12 with a number of the same being supplied around the annulus. A sealing strip 13 is also sealed at top and bottom to the annular rings 11 in order to make for an internal gas-tight chamber. Other than for this difference in construction the apparatus of FIG. 7 is contemplated as having the same uses as that of FIG. 6.

Figure 8:
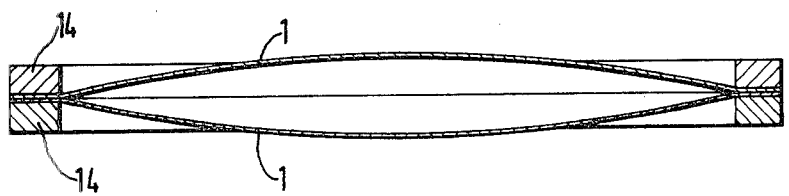
FIG. 8 is another embodiment of an apparatus for shaping the reflector membrane of this invention.

FIG. 8 shows an apparatus which is useful exclusively for producing reflectors and which is not itself suitable as a reflector. The apparatus of FIG. 8 comprises two annular rings 14 sealed to the peripheral edges of two reflector membranes 1 with means being provided (not shown) such as a conduit for injecting air under pressure between the membranes 1. The membranes 1 may be either elastically deformed or plastically permanently deformed. When the membranes 1 are only elastically deformed a suitable backing such as a foam backing must be applied to their outer surfaces (their ultimate back surfaces) while the pressure is maintained between the two membranes 1 and their shapes maintained substantially as shown in FIG. 8. When the membranes 1 are plastically permanently deformed the foam backing may be applied while they are still in the apparatus or, alternatively, they may be removed from the apparatus and then the foam backing applied since they will retain generally the shape given to them by the apparatus.

FIG. 9 shows a reflector membrane of this invention arranged in a ground depression. In this instance the reflector membrane is sealed in a gas-tight manner to an annular foundation 14 provided in the ground surrounding the depression. The foundation 14, the membrane 1 and the ground define the vacuum chamber 7. In order to insure that the chamber 7 is gas-tight a foil 15 such as a foil of plastic material is provided to cover entirely the area within the annular foundation 14. The periphery of the foil 15 should be sealed to the annular foundation 14 in some suitable manner and is preferably overlaid with a layer 19 of earth to prevent the foil 15 from lifting away from the ground depression when a vacuum is applied to the chamber 7. A suitable conduit (not shown) is provided through the annular foundation 14 in order that the vacuum chamber 7 may communicate with a source of vacuum under pressure and suitable regulator. It will be appreciated that this arrangement as with the apparatus of FIGS. 5, 6 and 7 when used as reflectors, require continuous operation of the vacuum source during use as a reflector and the regulator is provided in order to adjust the vacuum for small leaks that may occur and for other deleterious effects such as temperature differentials and the like.

In the arrangement of FIG. 9 an adjustable auxiliary reflector 16 is located in the region of the focal point of the reflector membrane 1 in such a manner as to reflect rays received from the membrane 1 to a receiver 17. The auxiliary reflector 16 may be mounted upon a suitable guyed telescoping mast 18 for adjustment. The auxiliary reflector 16 may be of any suitable and even variable form. The receiver 17 may contain a working medium, heat exchanger, or the like.

Various modifications will be apparent to those skilled in the art. For example, while reference has been made extensively herein to the use of a vacuum or compressed air and to gas-tight seals it will be appreciated that hydraulic fluids may be used in many instances as well. It is only necessary that a differential fluid pressure be achieved across the reflector membrane of a force sufficient to elastically deform or permanently plastically deform the membrane as the case may be.

We claim:

1. A reflector for use as an antenna, solar mirror, or the like comprising a concave membrane having a concave reflector surface, said membrane having been initially flat, said membrane being of a material that in its initial flat state is capable of being deformed in all directions in its plane, and said membrane being permanently deformed to its concave shape by stretching beyond its elastic limit.

2. The reflector of claim 1 including a rigid foam backing on the side of said membrane opposite to said concave reflector surface.

3. The reflector of claim 2 in which said foam backing has an outer skin on the surface thereof opposite to the surface of said foam secured to said membrane.

4. The reflector of claim 1 including a vacuum chamber, said membrane in permanently deformed condition serving as one wall of said vacuum chamber, and means for reducing the pressure in said chamber to maintain said membrane in its permanently deformed concave shape.

5. The reflector of claim 4 including a device for regulating the reduction in pressure in said chamber to maintain said permanently deformed membrane in its concave shape.

6. The reflector of claim 5 in which the wall of said vacuum chamber opposite to said permanently deformed membrane is a second closure membrane, and in which the edges of said membranes are maintained in spaced relation from each other by a rigid circumferential ring.

7. The reflector of claim 6 in which said second closure membrane has a stretch characteristic different than that of said permanently deformed membrane.

8. The reflector of claim 7 in which said rigid ring comprises a pair of rigid ring members each having secured thereto the circumferential edge of one of said membranes, said ring members being held spaced from each other by rods, and an air-tight sealing strip secured between said rigid ring members to form the edge circumference of said vacuum chamber.

9. The reflector of any one of claims 1, 4 or 5 in which said permanently deformed membrane is positioned in a concave ground depression.

10. The reflector of claim 9 including an annular foundation around the concave ground depression, a gas-tight foil in said ground depression over all of the area thereof within said foundation, said permanently deformed membrane being secured to the upper surface of said foundation in gas-tight relationship thereto, and means for maintaining said gas-tight foil in position.

11. The reflector of claim 10 in which said means for maintaining said gas-tight foil in position comprises a layer of earth thereover.

12. The reflector of claim 9 including an auxiliary reflector arranged in the region of the focal point of said permanently deformed membrane, a reflected ray receiver, and means for aligning said auxiliary reflector to reflect the rays received from said permanently deformed membrane to said reflected ray receiver.

13. The reflector according to any one of claims 1, 4, 5, 6, 7 or 8 in which said permanently deformed membrane is prestressed.

14. A method for producing a reflector comprising securing as one wall of a fluid chamber a reflector membrane having the characteristic of being deformable in all directions in its plane, sealing said membrane to said chamber in fluid-tight relationship thereto, and producing a differential pressure across said reflector membrane sufficient to permanently deform said membrane to a concave shape by deforming the membrane beyond its elastic limits.

15. The method of claim 14 including prestressing said reflector membrane prior to application thereto of the differential pressure.

16. The reflector of claim 10 including an auxiliary reflector arranged in the region of the focal point of said permanently deformed membrane, a reflected ray receiver, and means for aligning said auxiliary reflector to reflect the rays received from said permanently deformed membrane to said reflected ray receiver.

17. The reflector of claim 11 including an auxiliary reflector arranged in the region of the focal point of said permanently deformed membrane, a reflected ray receiver, and means for aligning said auxiliary reflector to reflect the rays received from said permanently deformed membrane to said reflected ray receiver.

18. The reflector according to claim 9 in which said permanently deformed membrane is prestressed.

19. The reflector according to claim 10 in which said permanently deformed membrane is prestressed.

20. The reflector according to claim 11 in which said permanently deformed membrane is prestressed.

21. The reflector according to claim 12 in which said permanently deformed membrane is prestressed.

* * * * *